US008083430B2

(12) United States Patent
Cermak

(10) Patent No.: US 8,083,430 B2
(45) Date of Patent: *Dec. 27, 2011

(54) CONNECTING ASSEMBLY BETWEEN A SHAFT JOURNAL AND A CONSTANT VELOCITY UNIVERSAL JOINT WITH THREADED SLEEVE

(75) Inventor: Herbert Cermak, Bessenbach (DE)

(73) Assignee: GKN Driveline Deutschland GmbH, Offenbach (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/731,820

(22) Filed: Mar. 25, 2010

(65) Prior Publication Data

US 2010/0239364 A1   Sep. 23, 2010

Related U.S. Application Data

(62) Division of application No. 11/664,445, filed as application No. PCT/EP2005/008049 on Jul. 23, 2005, now Pat. No. 7,712,994.

(30) Foreign Application Priority Data

Oct. 2, 2004   (DE) .......................... 10 2004 048 079

(51) Int. Cl.
 *F16B 7/18*   (2006.01)
(52) U.S. Cl. .................... 403/342; 403/246; 464/145
(58) Field of Classification Search .................. 403/296, 403/342, 343; 464/145, 173, 175, 906
See application file for complete search history.

(56) References Cited

U.S. PATENT DOCUMENTS

| 2,640,502 | A |   | 6/1953 | Powers |
| 2,718,381 | A |   | 9/1955 | Moon |
| 4,094,376 | A |   | 6/1978 | Welschof |
| 4,756,640 | A |   | 7/1988 | Gehrke |
| 4,909,774 | A |   | 3/1990 | Muller et al. |
| 5,246,254 | A |   | 9/1993 | LoJacono, Jr. et al. |
| 5,549,514 | A | * | 8/1996 | Welschof ...................... 464/145 |
| 5,624,318 | A |   | 4/1997 | Jacob et al. |
| 5,665,001 | A |   | 9/1997 | Jacob et al. |

(Continued)

FOREIGN PATENT DOCUMENTS

DE   3617983 A1   12/1987

(Continued)

OTHER PUBLICATIONS

PCT International Search Report for PCT/EP05/08049 dated Oct. 7, 2005.

(Continued)

*Primary Examiner* — Joshua Kennedy
(74) *Attorney, Agent, or Firm* — Rader, Fishman & Grauer, PLLC

(57) ABSTRACT

A connecting assembly is disclosed. The connecting assembly comprises a shaft journal, a constant velocity universal joint and a threaded sleeve. The shaft journal is axially secured. The constant velocity universal joint has an inner joint part engaged by the shaft journal in a rotationally fixed way so as to transmit torque. The threaded sleeve is at least indirectly connected to the inner joint part so as to be axially secured and freely rotatable relative to the inner joint part. The threaded sleeve comprises a thread which is threaded on to a counter thread on the shaft journal so as to axially fix the inner joint part to the shaft journal.

14 Claims, 4 Drawing Sheets

U.S. PATENT DOCUMENTS

| | | | |
|---|---|---|---|
| 6,152,825 | A | 11/2000 | Doell |
| 6,315,671 | B1 | 11/2001 | Bilz et al. |
| 7,534,172 | B2 * | 5/2009 | Wormsbaecher ............ 464/175 |
| 7,712,994 | B2 * | 5/2010 | Cermak ....................... 403/342 |
| 2001/0016520 | A1 | 8/2001 | Sahashi et al. |
| 2007/0032303 | A1 | 2/2007 | Disser et al. |
| 2007/0093303 | A1 | 4/2007 | Wormsbaecher et al. |
| 2007/0149298 | A1 | 6/2007 | Wormsbaecher |
| 2008/0188317 | A1 | 8/2008 | Booker |
| 2008/0293500 | A1 | 11/2008 | Hahn et al. |

FOREIGN PATENT DOCUMENTS

| | | |
|---|---|---|
| DE | 4419342 C1 | 7/1995 |
| DE | 4419341 C1 | 11/1995 |
| DE | 29516626 | 1/1996 |
| DE | 10215657 | 10/2003 |
| DE | 103 42 497 A1 | 4/2005 |
| DE | 10344703 | 4/2005 |
| EP | 0831008 | 3/1998 |
| EP | 1519063 | 3/2005 |
| FR | 2712049 | 5/1995 |
| GB | 597667 | 1/1948 |
| GB | 2184201 | 6/1987 |
| WO | WO-98/35174 | 8/1998 |

OTHER PUBLICATIONS

"Gelenke und Gelnkwellen" Berechnung, Gestaltung, Anwendungen; authors-H.-CH. Graf Von Seherr-Thoss, F. Schmelz and E. Aucktor.

* cited by examiner

CONNECTING ASSEMBLY BETWEEN A SHAFT JOURNAL AND A CONSTANT VELOCITY UNIVERSAL JOINT WITH THREADED SLEEVE

CROSS-REFERENCE TO RELATED APPLICATIONS

This application is a divisional application and claims priority to U.S. Ser. No. 11/664,445 filed on Jul. 23, 2005, which application is a National phase application of PCT/EP2005/008049 filed on Jul. 23, 2005, which claims benefit of German Application No. 10 2004 048 079.6 filed on Oct. 2, 2004, said applications are hereby incorporated by reference in their entireties.

TECHNICAL FIELD

The invention relates to a connecting assembly between a shaft journal which is supported directly and a constant velocity universal joint whose inner joint part is rotationally securely engaged by the shaft journal, more particularly used in the propeller shaft of a motor vehicle drive. The shaft journal can be axially and radially secured in a manual gearbox or in an axle drive, with the constant velocity universal joint then being located at one end of the propeller shaft. The shaft journal can also be radially resiliently suspended in an resilient intermediate bearing, with the constant velocity universal joint then being used as a central bearing of a two-part propeller shaft.

BACKGROUND

The installation space of motor vehicles is subjected to greater and greater restrictions. This also applies to the installation space for the driveline. At the same time, more stringent requirements have to be met by the mounted driveline as far as reliable residual out-of-balance is concerned.

In the case of present-day solutions, the rear propeller shaft joint is connected to the axle drive input journal via a flange connection, and it has to be accepted that the tolerances of the flange runout (in respect of the shaft journal axis), of the joint runout and the joint/flange fit are added up, a particular problem being the axial fixing of the joint relative to the shaft journal.

From WO 98/35174 it is known to connect the outer joint part of the rear propeller shaft joint directly via splines to the input journal of the axle drive.

SUMMARY

The present invention provides a connecting assembly of the initially defined type wherein it is possible to achieve a connection by means of secure axial fixing mechanism in a simple way, more particularly involving a simple assembly procedure.

A first solution is characterised by a threaded sleeve which is held so as to be axially secured and freely rotatable relative to the inner joint part and which comprises a thread which is threaded on to a counter thread on the shaft journal. It is proposed that the thread of the threaded sleeve is an inner thread and the counter thread at the shaft journal is an outer thread. It is also proposed that an outer thread at the shaft journal carries a nut against which the threaded sleeve is made to stop and is secured against rotation. The anti-rotation effect can be achieved by prick punch or by other prior art means.

According to a first embodiment, the threaded sleeve is connected to the inner joint part and, more particularly; engages a recess in the inner joint part, in which recess there is arranged an axial securing mechanism The connection between the threaded sleeve and the inner joint part can be achieved by a securing ring.

According to a second embodiment, the threaded sleeve is directly connected to an intermediate sleeve, which is welded to the inner joint part and, more particularly, extends over the intermediate sleeve by means of a recess in which there is formed an axial securing mechanism.

The above-mentioned nut on the shaft journal more particularly serves to clamp the rolling-contact bearing on the shaft journal.

A second solution is characterized by a threaded sleeve, which is axially secured and arranged so as to be freely rotatable relative to the shaft journal and comprises a thread which, via a counter thread, can be at least indirectly threaded to the inner joint part. More particularly, the freely rotatable connection can be achieved between the threaded sleeve and a nut threaded on to the shaft journal, wherein the threaded sleeve, more particularly, engages a recess in the nut in which the axial securing mechanism is arranged. The threaded connection between the threaded sleeve and the inner joint part can be achieved indirectly via a projecting sleeve connected to the inner joint part or directly via a projecting sleeve integrally formed on to the inner joint part. More particularly, the threaded sleeve is an outer thread and the counter thread at the inner joint part an inner thread which is provided in a projecting sleeve which is attached to the inner joint part. The threaded sleeve is made to abut against the attachable sleeve or against the inner joint part while being rotationally secured. In this case, too, said nut on the shaft journal can simultaneously serve to clamp a rolling contact bearing on the shaft journal.

For both solutions, for axially freely. securing the threaded sleeve relative to the inner joint part and, respectively, to the shaft journal, there is provided a securing ring engaging corresponding annular grooves. The annular grooves are preferably provided on the threaded sleeve on the one hand and on the inner joint part or on the attachable sleeve and the nut respectively on the other hand.

According to a particularly advantageous embodiment which, to a large extent, permits the grease-filled, sealed constant velocity joint to be pre-assembled, a seal, at its outer circumference, is at least indirectly sealingly and rotationally securely connected to the outer joint part of the constant velocity universal joint, which seal, at its inner circumference, sealingly rests on the threaded sleeve, the intermediate sleeve or the projecting sleeve.

For this purpose, at the end of the inner joint part, which end is opposed to the seal and points to the propeller shaft tube, there is attached a further cover which sealingly closes the aperture of the inner splines of the inner joint part. The propeller shaft tube itself is connected to the outer joint part of the constant velocity universal joint.

The inventive connecting assembly has the following advantages:
  the constant velocity universal joint, the sealing mechanism and the axial securing mechanism form one unit;
  the assembly can be released in a non-destructive way and can be repeatedly closed; it can be released and re-closed at most while destroying and replacing the securing ring;
  the constant velocity universal joint and the axial securing mechanism can be provided in the form of a grease-filled, sealed unit without having to provide any additional transport sealing means;

said unit can be mounted very easily on the shaft journal;
simple modifications allow a corrosion protection for the adjoining technical parts, more particularly, for the thread of a clamping nut for clamping the shaft journal bearing;
the inventive connecting assembly is largely independent of the type of joint used.

The inventive connection between the inner joint part and the shaft journal via splines comprises only one single toleranced connection. The position of the rotational axis of the propeller shaft can be fixed much more accurately. Any out-of-balance resulting from the eccentricity of mounting the joint is avoided.

BRIEF DESCRIPTION OF THE DRAWINGS

Preferred embodiments of the invention are illustrated in the drawings and will be described below.

DETAILED DESCRIPTION OF THE DRAWINGS

Figure 1:
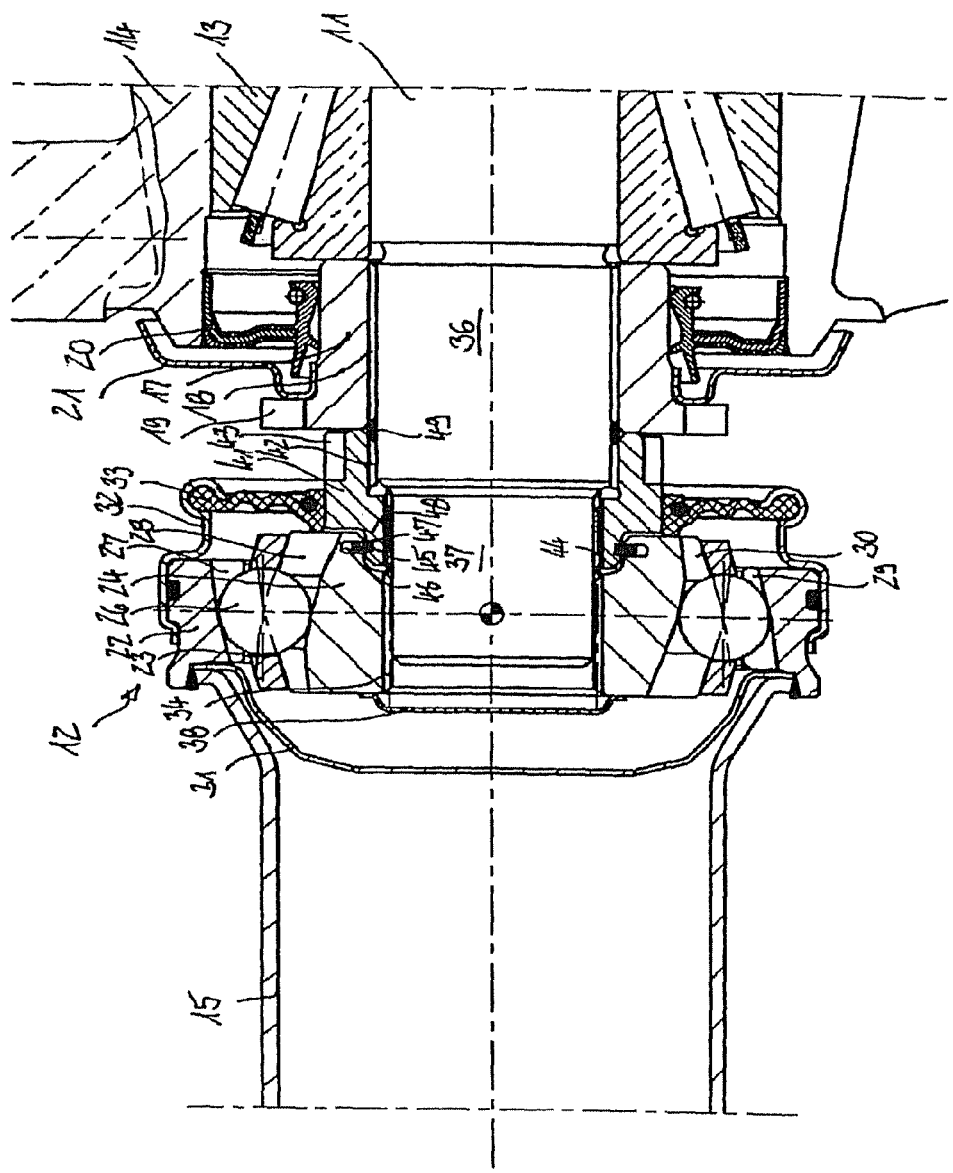
FIG. 1 shows a first embodiment of an inventive connecting assembly having a threaded sleeve which is rotatable relative to the inner joint part.

Initially, the Figures will be described jointly to the extent that they can be seen to comprise details corresponding to one another. A shaft journal 11 is connected to a constant velocity universal joint 12 in the form of a counter track fixed joint in a way yet to be described in greater detail. The shaft journal is axially and radially supported by a rolling contact bearing 13 in a drive housing 14. The rolling contact bearing is axially clamped in by a nut 17 which, via its inner thread 18, is threaded onto a threaded portion 36 of the shaft journal 11. The nut 17 comprises key engagement means 19. The nut 17 is sealed via a shaft seal 20 relative to the axle drive housing 14, which nut is protected against being damaged by a protective cap 21. The constant velocity universal joint comprises an outer joint part 22, an inner joint part 24, torque transmitting balls 26 and a ball cage 23. The balls are held in first outer ball tracks 27 and in first inner ball tracks 28 which open towards the housing 14 and are held in second outer ball tracks 29 and second inner ball tracks 30 which open towards the opposite end.

A hollow shaft 15 is welded to the outer joint part 22, with a cover 31 being inserted between the end of the hollow shaft 15 and the outer joint part 22. At the end opposed to the drive housing 14, there is welded a further cover to the inner joint part 24. The inner joint part 24 is positioned in inner splines 34 on a splined portion 37 of the shaft journal 11.

In FIG. 1, the mechanism for axially securing the inner joint part 24, and thus the entire constant velocity universal joint 12 with the adjoining hollow shaft, 15 relative to the shaft journal 11 comprises a threaded sleeve 41' which, by means of its inner thread 42, is threaded on to the threaded portion 36 of the shaft journal 11 until it stops against the nut 17. The threaded sleeve 41 comprises circumferentially distributed key engagement means 43. Between the nut 17 and the threaded sleeve 41 there is inserted an O-ring seal 49.

Furthermore, the threaded sleeve 41 comprises a sleeve projection 48 which is freely rotatable relative to the shaft splines 37 and which is inserted into an inner recess 44 in the inner joint part 24. Between the sleeve projection 48 and the recess 44 there is provided a securing ring 45 which engages matching annular grooves 46, 47 and which secures the threaded sleeve 41 in an axially fixed but rotatable way relative to the inner joint part 24. A membrane seal 33 arranged in an outwardly sealing way on the threaded sleeve 41 is secured to the outer joint part 22 by means of a plate metal sleeve 32. The unit including the constant velocity universal joint 12 and the welded-on hollow shaft 15 can be pre-mounted, including the threaded sleeve 41 and the membrane seal 33; the universal joint is already filled with grease and does not require any further sealing means for transport purposes.

The described unit that includes the constant velocity universal joint 12 and the threaded sleeve 41 can be axially slid on to the splines ends 37 of the shaft journal 11 without said sliding movement being obstructed by the threaded sleeve 41. The shaft splines 37 engage the inner splines 34 at the inner joint part 24. The axial securing mechanism between the shaft journal 11 and the constant velocity joint 12 are then put into effect by threading the inner thread 42 of the threaded sleeve 41 on to the threaded portion 36 of the shaft journal 11. After the threaded sleeve 41 has stopped against the nut 17, the threaded sleeve is rotationally secured, as this has already been put into effect for the nut 17 after the pretension for the rolling contact bearing 13 has been set.

According to a different type of mounting procedure, it is also possible to thread the threaded sleeve 41 on to the threaded portion 36 prior to assembling the constant velocity universal joint 12 and to achieve the axial fixing between the threaded sleeve and the inner joint part 24 by means of the securing ring 45 when sliding the inner joint part 24 on to the shaft splines 37.

Figure 2:
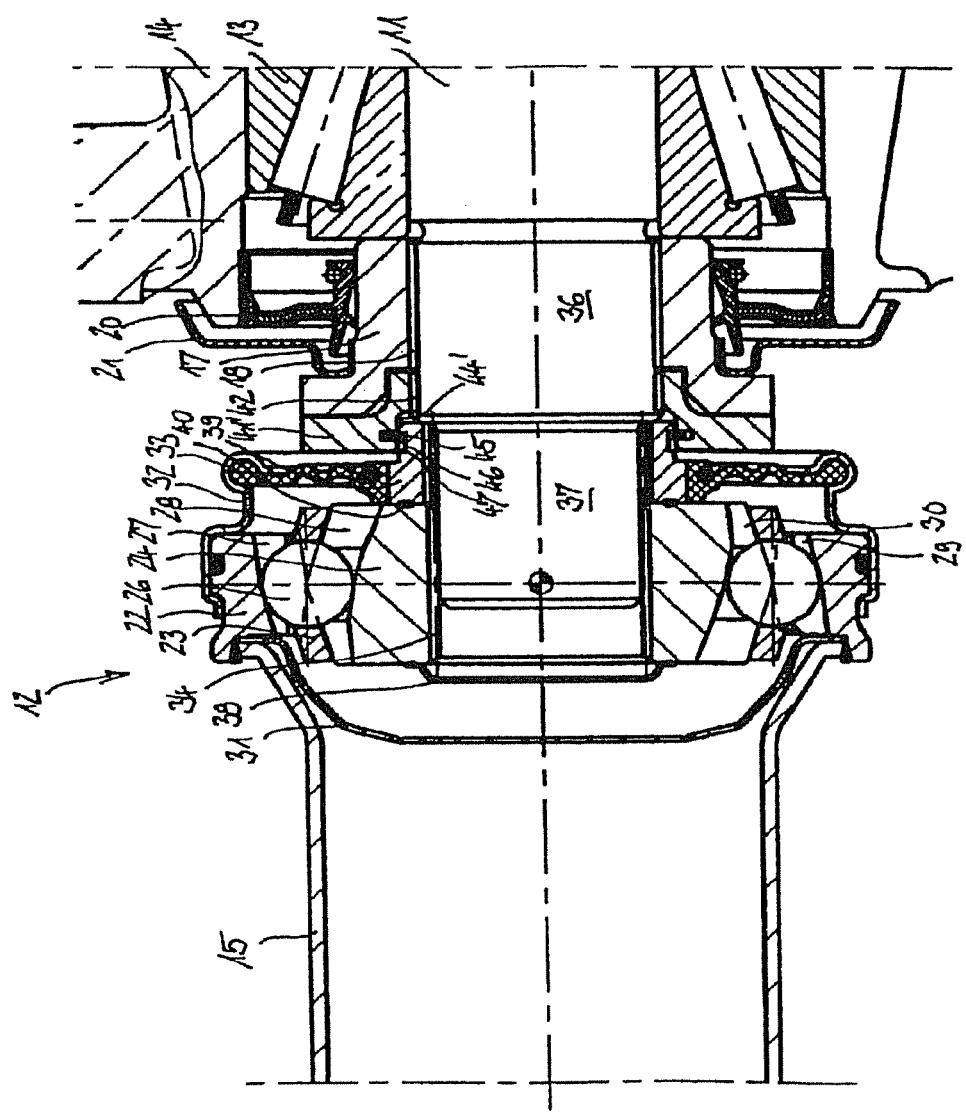
FIG. 2 shows a second embodiment of an inventive connecting assembly whose threaded sleeve is rotatable relative to the shaft journal.

In FIG. 2, the mechanism for axially securing the inner joint part 24, and thus the entire constant velocity universal joint 12 with the adjoining hollow shaft 15, relative to the shaft journal 11, comprises a threaded sleeve 41' which, by means of its inner thread 42, is threaded on to the threaded portion 36 of the shaft journal 11 until it stops against the nut 17. The threaded sleeve 41' comprises an inner recess 44' which is engaged by an intermediate sleeve 39 which is connected to the inner joint part by a weld 40. The intermediate sleeve 39 can also engage the shaft splines 37. Between the intermediate sleeve 39 and the recess 34' there is provided a securing ring 45 which engages matching annular grooves 46, 47 and secures the threaded sleeve 41' in an axially fixed, but rotatable way relative to the inner joint part 24. A membrane seal 33 which is outwardly sealingly arranged on the intermediate sleeve 39 is secured to the outer joint part 22 by means of a plate metal sleeve 32. The unit that includes the constant velocity joint 12 and the welded-on hollow shaft 15, can be pre-assembled, including the threaded sleeve 41 and the membrane seal 33, and the universal joint can already be filled with grease.

The described unit that includes the constant velocity joint 12, the intermediate sleeve 39 and the threaded sleeve 41' can be slid on to the splines ends 37 of the shaft journal 11 without the axial sliding process being obstructed by the threaded sleeve 41'. The axial securing mechanism between the shaft journal 11 and the constant velocity joint 12 are then put into effect by threading the inner thread 42 of the threaded sleeve 41' on to the threaded portion 36 of the shaft journal 11. After the threaded sleeve 41' has stopped against the nut 17, the threaded sleeve is rotationally secured as this has already been put into effect for the nut 17 after the pretension for the rolling contact bearing 13 has been set.

According to a different type of mounting procedure, it is also possible to thread the threaded sleeve 41' on to the threaded portion 36 of the shaft journal 11 prior to assembling the constant velocity universal joint 12 and to achieve the axial fixing between the threaded sleeve 41' and the intermediate sleeve 39 by means of the securing ring 45 when sliding the inner joint part 24 on to the shaft splines teeth 37.

Figure 3:
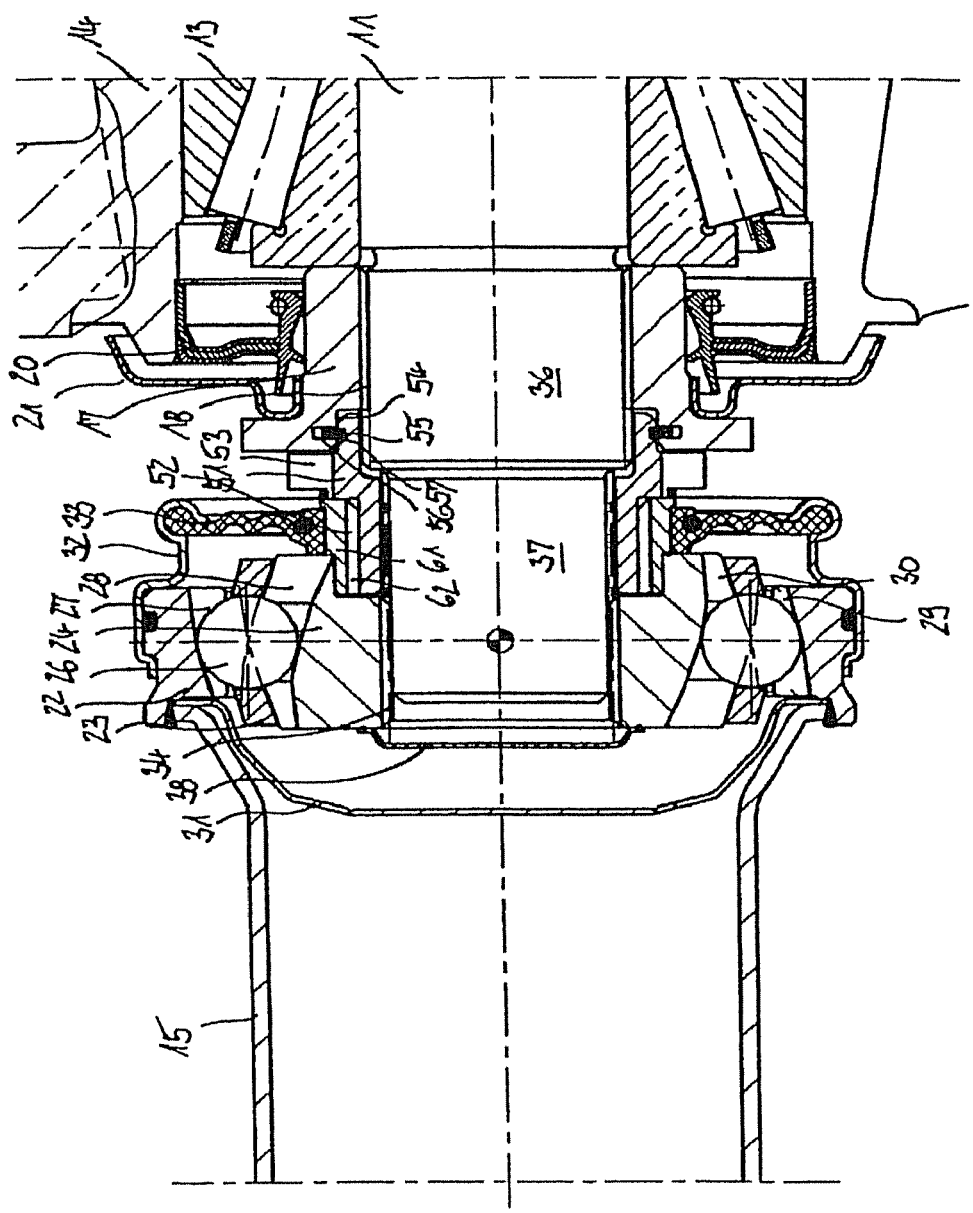
FIG. 3 shows a first embodiment of an inventive connecting assembly having a threaded sleeve which is rotatable relative to the shaft journal.
Figure 4:
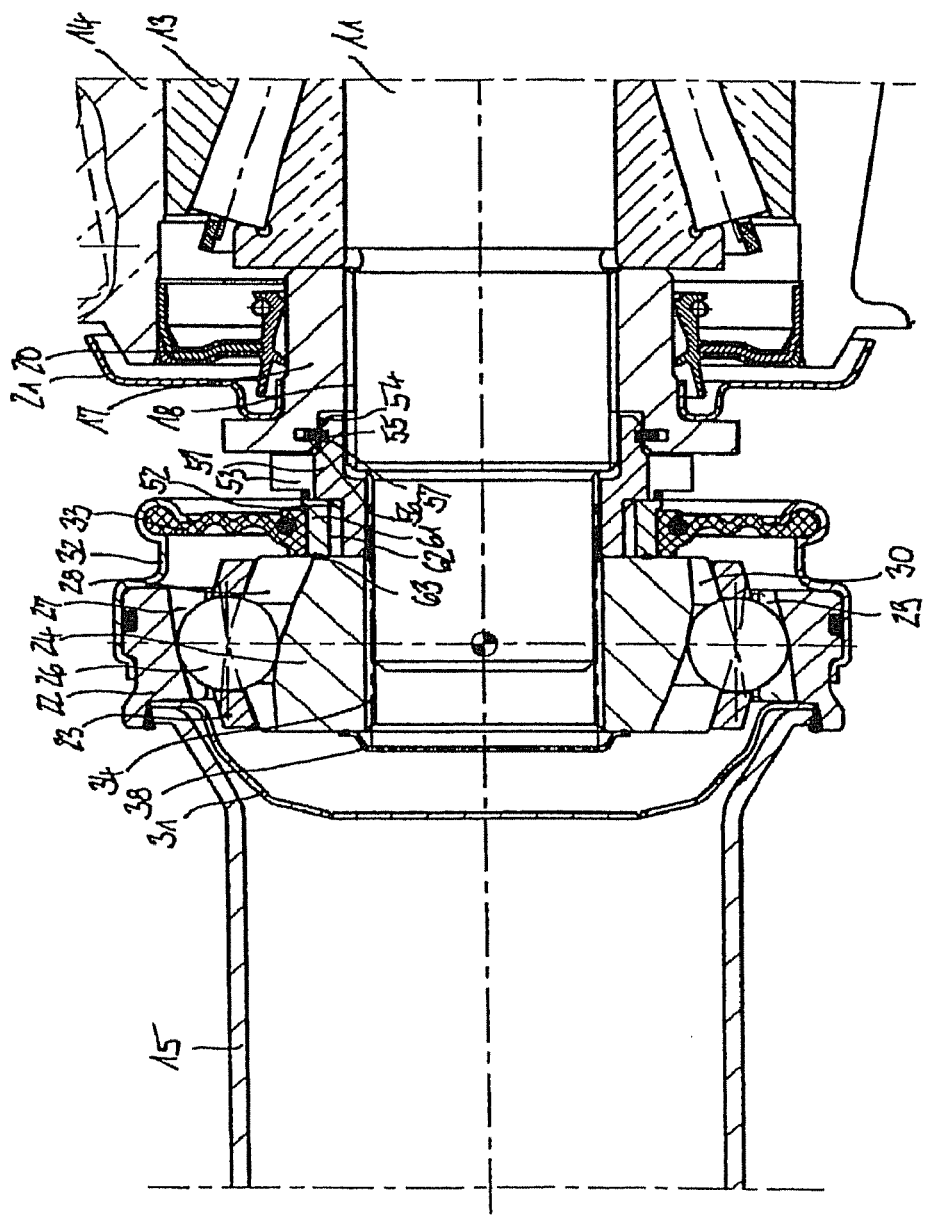
FIG. 4 shows a second embodiment of an inventive connecting assembly whose threaded sleeve is rotatable relative to the shaft journal.

In FIGS. 3 and 4, the axial connection between the shaft journal 11 and the constant velocity universal joint 12 is essentially effected by the threaded sleeve 51 which engages a recess 54 in the nut 17. The threaded sleeve 51 and the nut 17 are connected to one another via a securing ring 55 so as to be axially fixed but rotatable relative to one another, which securing ring engages matching annular grooves 56, 57 in the threaded sleeve 51 and the recess 54. Furthermore, the threaded sleeve, by means of an outer thread 52, engages an inner thread 62 in the projecting sleeve 61 which is welded to the inner joint part 24 of the constant velocity joint 12. A membrane seal 33 which is outwardly sealingly arranged on the projecting sleeve 61 is secured to the outer joint part 22 by means of a plate metal sleeve 32. The pre-assembled unit consisting of the constant velocity joint 12 and the hollow shaft 15 with the seal 33 can also be completely assembled, filled with grease and sealed in order, then, to be connected to the shaft journal 11. As described above, the threaded sleeve 51 has already been axially fixed to the nut 17 by means of a securing ring 55. When sliding the inner splines 34 of the inner joint part 24 on to the shaft splines 37 of the shaft journal 11, the threaded sleeve 51, by means of its outer thread, is threaded into the inner thread 62 of the projecting sleeve 61 until the threaded sleeve 51 axially stops against the projecting sleeve 61. Thereafter, the two sleeves 51, 61 are rotationally secured relative to one another by local plastic deformation.

According to a different type of mounting procedure, it is also possible to thread the threaded sleeve 51 into the projecting sleeve 61 prior to assembly and to achieve the axial fixing between the threaded sleeve 51 and the nut 17 by means of the securing ring 55 when sliding the inner joint part 24 on to the shaft splines 37.

Whereas, in FIG. 3, the projecting sleeve 61 has already been partially inserted into the inner joint part 24 and then welded thereto, in FIG. 4 the projecting sleeve 61' and the inner joint part 24 abut one another.

The invention claimed is:

1. A connecting assembly comprising:
   a shaft journal which is axially secured and radially supported in a drive housing, and
   a constant velocity universal joint having a one-piece inner joint part which is directly engaged by the shaft journal in a rotationally fixed way so as to transmit torque, wherein the inner joint part comprises a recess formed in an end face thereof;
   a threaded sleeve which engages said recess of the inner joint part such that the threaded sleeve is at least indirectly connected to the inner joint part so as to be axially secured and freely rotatable relative to the inner joint part, wherein said threaded sleeve comprises a thread which is threaded on to a counter thread on the shaft journal so as to axially fix the inner joint part relative to the shaft journal.

2. An assembly according to claim 1, wherein the thread of the threaded sleeve is an inner thread and the counter thread at the shaft journal is an outer thread.

3. An assembly according to claim 1 comprising a nut, which is threaded onto an outer thread of the shaft journal, wherein the threaded sleeve is threaded onto the counter thread of the shaft journal so as to rotationally secure said threaded sleeve relative to said nut after having been threaded on to the counter thread of the shaft journal.

4. An assembly according to claim 3, wherein the threaded sleeve abuts against the nut.

5. An assembly according to claim 1 comprising a seal which, at its outer circumference, is at least indirectly sealingly connected to the outer joint part of the constant velocity universal joint and is rotationally secured thereon, and the seal, at its inner circumference, is sealingly positioned on the threaded sleeve.

6. An assembly according to claim 5, wherein the seal is provided in the form of a membrane seal.

7. An assembly according to claim 5, wherein the threaded sleeve comprises a sleeve projection which engages the recess of the inner joint part, and a central portion which, on an outer circumferential surface thereof, accommodates the seal.

8. An assembly according to claim 7, wherein a first outer diameter of the sleeve projection is smaller than a second outer diameter of the central portion of the threaded sleeve.

9. An assembly according to claim 7, wherein the threaded sleeve comprises a threaded portion extending from the central portion, which threaded portion is threaded onto the shaft journal and which, on an outer face thereof, comprises circumferentially distributed key engagement means.

10. An assembly according to claim 1, wherein the threaded sleeve is axially secured to the inner joint part by a securing ring engaging an outer annular groove of the threaded sleeve and an inner annular groove of the inner joint part.

11. An assembly according to claim 10, wherein the inner annular groove of the inner joint part, which inner annular groove is engaged by the securing ring, is formed in an inner circumferential surface of the recess of the inner joint part.

12. An assembly according to claim 10, wherein the outer annular groove of the threaded sleeve, which outer annular groove is engaged by securing ring, is formed in an outer circumferential surface of the threaded sleeve.

13. An assembly according to claim 1, wherein the constant velocity universal joint further comprises an outer joint part and torque transmitting balls, said torque transmitting balls being held between outer ball tracks of the outer joint part and inner ball tracks of the inner joint part so as to transmit torque between the outer joint part and the inner joint part.

14. An assembly according to claim 1, wherein the recess, starting from the end face of the inner joint part, extends in axial direction and is radially open towards a central throughbore of the inner joint part.

* * * * *